Dec. 9, 1958
R. H. WEILAND
2,863,321
TORQUE TRANSMITTING MECHANISM
Filed Nov. 4, 1957
3 Sheets-Sheet 1
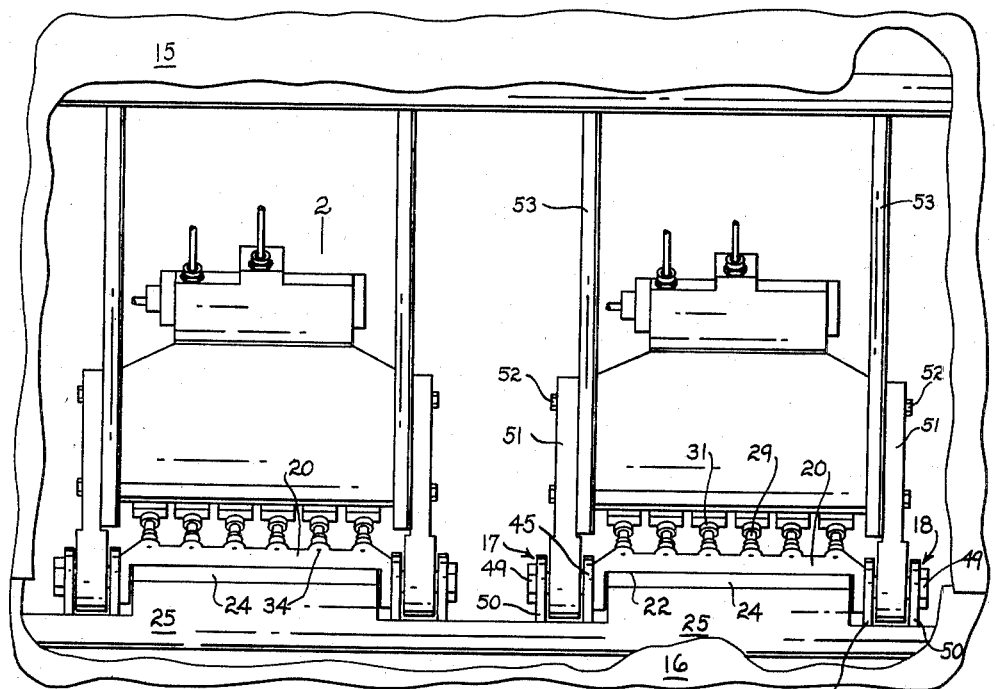
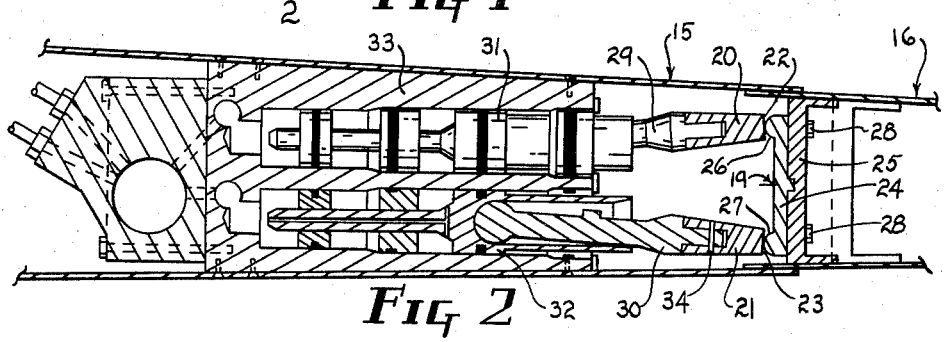
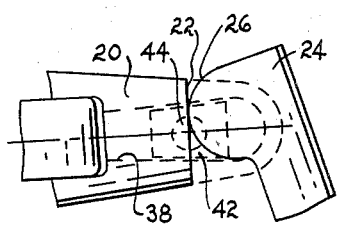
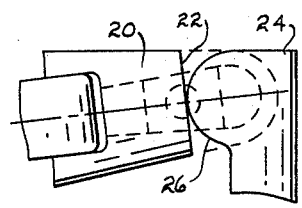
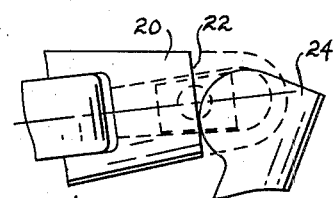
INVENTOR.
RICHARD H. WEILAND
BY
ATTORNEY Dec. 9, 1958  R. H. WEILAND  2,863,321
TORQUE TRANSMITTING MECHANISM
Filed Nov. 4, 1957  3 Sheets-Sheet 3
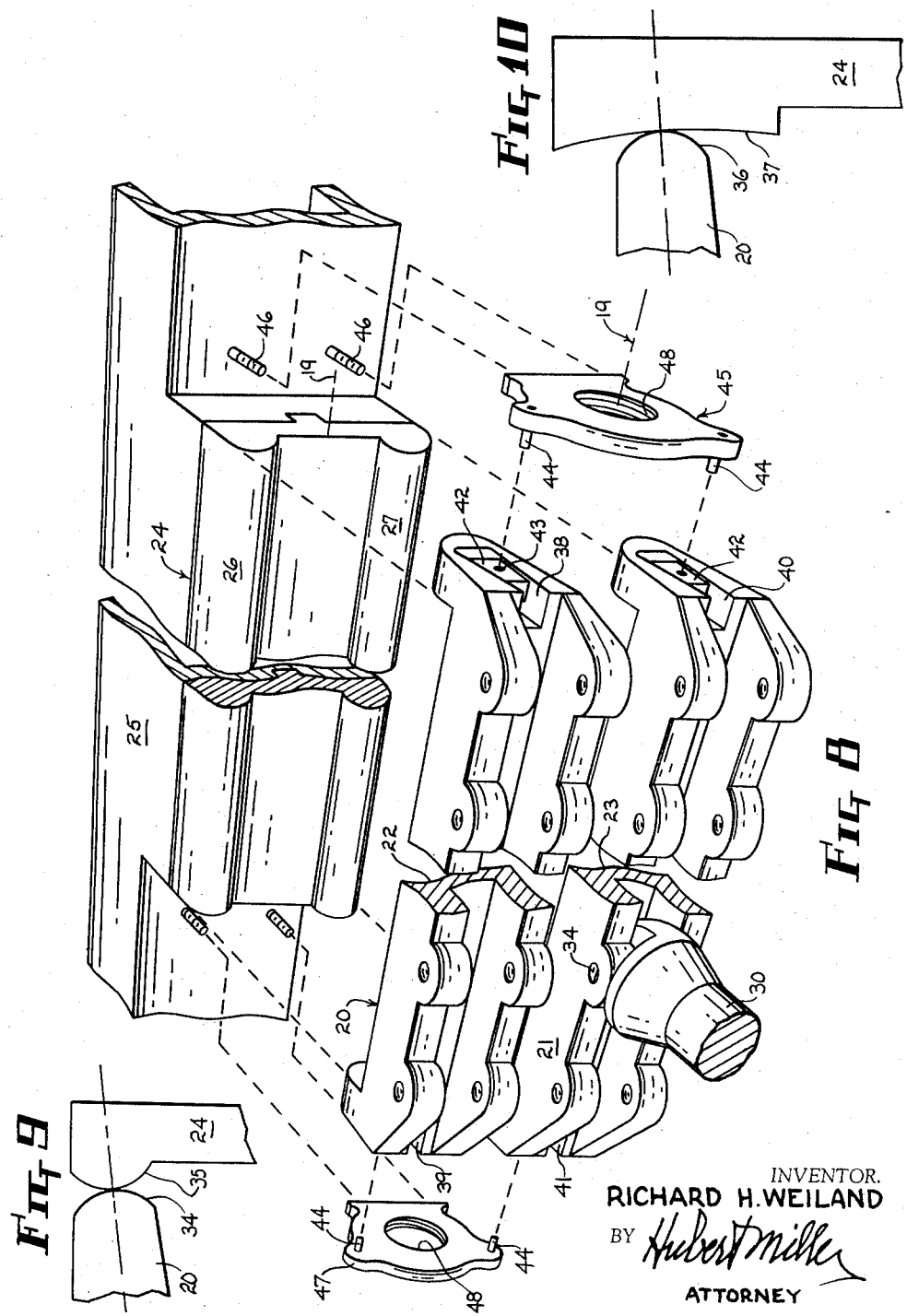
INVENTOR.
RICHARD H. WEILAND
BY Hubert Miller
ATTORNEY

United States Patent Office 2,863,321
Patented Dec. 9, 1958

2,863,321

TORQUE TRANSMITTING MECHANISM

Richard H. Weiland, Seattle, Wash., assignor to Boeing Airplane Company, Wichita, Kans., a corporation of Delaware Application November 4, 1957, Serial No. 694,217

9 Claims. (Cl. 74—102)

This invention relates to a mechanism for transmitting a substantially tangential thrust force to the outer end of a crank arm, bell crank or similar pivoted member to force the member to turn about its pivot axis.

The invention applied more particularly to cases in which a force of great magnitude is necessary to turn the pivotally mounted member. In such cases the resistance of the pivoted member against turning about its axis may be very great. The permitted length of the moment arm may be very short. The load per square inch of the surface area in contact with the thrust transmitting member may be relatively large because the contact surface area is small, and continuous lubrication between the contacting surfaces of the pivoted member and the thrust transmitting member may be impossible or impractical due to high ambient temperature, or for other reasons.

When the required force for moving the pivoted member about its axis is of relatively low magnitude conventional mechanisms may be employed for transmitting the force from the force transmitting member to the pivoted member, i. e., the ball and socket connection between the valve lifting rod and the valve moving rocker arm in an overhead valve type automobile engine, or the journalling of the crank shaft pin in a bearing mounted in one end of a connecting rod in a conventional internal combustion engine.

In such conventional mechanisms, the applied load per square inch of the surfaces in actual contact is relatively small. This statement refers to that portion of the surface of the connecting rod bearing which is in actual contact with a limited portion of the surface of the crank shaft pin during the piston created thrust transmitting movement of the connecting rod. In such cases the frictional movement between the two surfaces in contact creates no particular difficulty, primarily due to the fact that the contact area load is small and the surfaces are easily kept well lubricated. The actual surface area load may be no more than 1000 p. s. i.

When the contact area load between such surfaces is increased to 12000 p. s. i. to 15000 p. s. i. and lubrication between the contacting surfaces is impossible due to an ambient temperature of 1000° F. or higher, then the least sliding friction between the contacting surfaces results in extremely fast wear of those surfaces and extremely short life for the parts in contact. Reliability of the mechanism is hence nil.

It is the primary purpose of this invention to provide a mechanism of the type mentioned which will reduce friction between the thrust transmitting member and the pivoted member to a minimum, and which is therefore capable of operating reliably over an extended time period under the last above described extreme load and temperature conditions.

Another important object is to provide a torque transmitting mechanism of the class mentioned which requires no lubrication between the contacting surfaces of the thrust transmitting member and the pivotally mounted thrust receiving member, even under the extreme load and temperature conditions recited above.

While the inventive principle is capable of being embodied as a component in many different types of mechanisms and for various purposes, only one embodiment is illustrated and described herein. The invention is illustrated and described as a practical mechanism for moving an airplane flight control surface about its fixed pivot axis.

The example airplane is of the high speed class, assumed for purposes of illustration and clarity to be capable of speeds of 1500 to 2500 knots. The wing design of such airplanes necessarily limits the wing chord thickness at the spanwise hinge axis of the wing control surface to one to two inches. Consequently the moment arm through which a torque force can be transmitted to the control surface is extremely limited in length, primarily because no torque arm can be permitted to project outward from the skin surface of the wing or its control surface. Furthermore, at the speeds assumed air friction creates extremely high temperatures in the vicinity of the control surface hinge axis, and lubrication of the contacting or working surfaces of the thrust transmitting member and of the thrust receiving member is impossible due to prompt disintegration of the lubricant by heat.

Since the moment arm through which a control surface deflecting force can be transmitted in such an airplane is limited to approximately ¾″ or less, and since the resistance of the control surface to movement into the air stream is very great at such speeds, the actual force which must be transmitted to the control surface torque arm is extremely large, and the resulting load applied to the contacting surfaces of the thrust transmitting member and the control surface torque arm is extremely high.

Accordingly, it is a more particular object of this invention to provide a mechanism which is capable of deflecting a control surface on the type of airplane mentioned above, and which will do so reliably over an extended time period, and without the need for lubricant on its contacting load bearing surfaces.

The invention, together with other objects, will be more clearly understood when the following description is read in connection with the accompanying drawings, in which:

Fig. 1 is a fragmentary top plan view of the aft portion of an airplane wing showing one embodiment of the invention installed thereon to transmit a torque force from a power source to the leading edge of a flight control surface which is pivotally connected to the trailing edge of the wing proper, the wing skin being cut away for clarity;

Fig. 2 is a vertical section view taken along the line 2—2 of Fig. 1;

Figs. 3, 4 and 5 are fragmentary schematic views illustrating the relative rolling movement between the thrust transmitting member and the thrust receiving member during deflection of the airplane control surface;

Fig. 8 is an enlarged fragmentary view showing details of construction of the thrust transmitting member and of the thrust receiving member, together with the details of construction of the re-positioning means mentioned above;

Figs. 9 and 10 are fragmentary side views illustrating thrust transmitting and thrust receiving members with different types of rolling contact surfaces, in accordance with this invention.

Like reference numerals represent like parts in all drawing figures.

Figure 6:
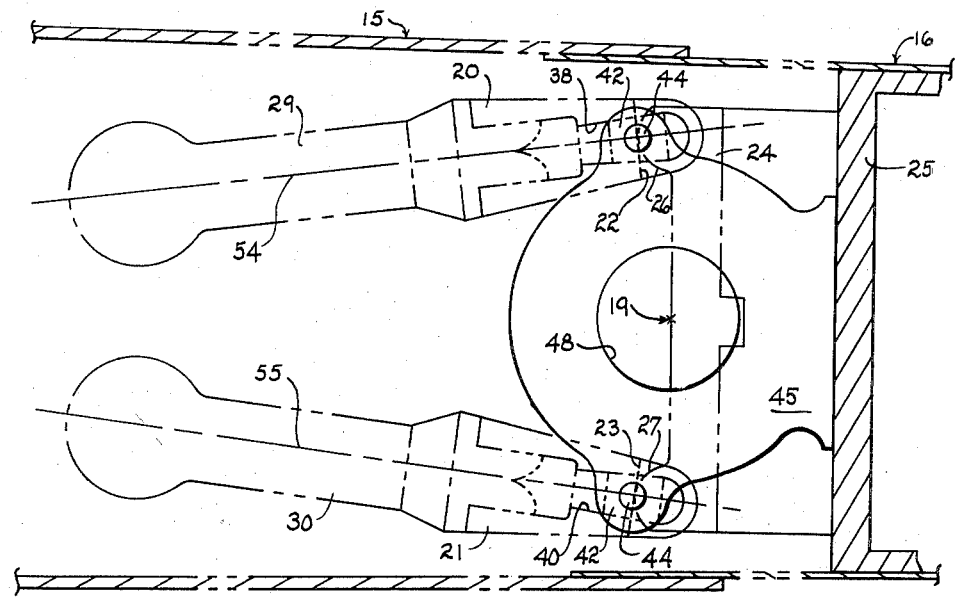
Figs. 6 and 7 are enlarged fragmentary side views, with parts in section, ilustrating one means of re-positioning the thrust receiving member as the airplane control surface is returned to its normal or neutral position.

Referring more particularly to Figs. 1 and 2 of the drawing, the fixed portion of the airplane wing is designated as a whole by numeral 15, and the movable control surface is designated as a whole by the numeral 16. The leading edge of control surface 16 is pivotally connected to the trailing edge of wing 15 by a series of spanwise aligned hinge joints, designated by the numerals 17 and 18. The relative location of this control surface hinge or pivot axis is indicated in Figs. 2, 6, 7 and 8 by the numeral 19.

In the illustrated embodiment the thrust transmitting members are in the form of vertically spaced substantially identical upper and lower striker bars 20 and 21. These bars are elongated spanwise of the wing and have rolling contact surfaces 22 and 23 respectively, extending along and parallel to hinge axis 19, one above and one below such axis, as clearly illustrated in Fig. 2.

Force is transmitted by said striker bars to the control surface 16 through a thrust receiving member in the form of a striker plate 24 which is rigidly secured flat against the forward face of the control surface leading edge spar 25, as by bolts 28 (Fig. 2). There are a plurality of striker plates 24, one for each associated pair of striker bars, as shown in Fig. 1. Each plate 24 is elongated spanwise, and is substantially equal in length to the striker bar rolling contact surfaces 22—23. Along its upper and lower edges each thrust receiving member or plate 24 is provided with rolling contact surfaces 26 and 27, spaced equidistantly above and below hinge axis 19 and parallel thereto. Rolling contact surfaces 26 and 27 are normally in contact with rolling contact surfaces 22 and 23 respectively. When force is transmitted from striker bar 20 to plate 24 through the contacting surfaces 22 and 26 the relative movement of the surfaces is a rolling movement rather than a sliding frictional movement, as clearly illustrated in Figs. 3 to 5 and 7.

Rolling contact surfaces 22 and 23 are illustrated as being planar and rolling contact surfaces 26 and 27 as being convexly arcuate in cross section. The invention is not limited to such surface configurations, however. As shown in Figs. 9 and 10 both surfaces may be convexly elliptical, or one may be convexly arcuate or elliptical and the other concavely arcuate or elliptical. These various surface configurations have been proven effective for the intended purpose of this invention.

As shown in Figs. 1 and 2 the force required to deflect the pivoted thrust receiving member (plate 24 and control surface 16) from its neutral position is applied to the thrust transmitting members 20 and 21 by two vertically spaced spanwise extending rows of push rods 29 and 30 actuated by co-acting similarly spaced rows of hydraulically actuated pistons 31 and 32 mounted in a cylinder block 33. One end of each push rod engages a respective one of said pistons. The other end of each push rod is secured to a respective striker bar by means of a pin 34 (Figs. 2 and 8). By suitable controls (not shown) of the hydraulic system, all the pistons 31 are actuated simultaneously, as are the pistons 32 in the lower row. The details of construction and operation of such a hydraulic system is clearly described in my pending U. S. patent application Ser. No. 508,701, filed May 16, 1955. Since the specific power means for applying force to the force transmitting members 20 and 21 is unimportant to the present invention, it is believed unnecessary to provide a more detailed explanation in this application. It will be understood that when all pistons 31 are moved aft, all the pistons 32 are permitted to simultaneously move forward, and vice versa. During such piston movement the control surface 16 is forced to move in one direction or the other about its axis 19.

While it is not an essential component of my invention, the embodiment illustrated includes a means the primary purpose of which is to assure that the contacting surface of the thrust transmitting member is always centered with respect to the contacting surface of the thrust receiving member when the latter is in its neutral position, and prior to the start of each deflection cycle. This statement refers to the contacting surfaces 22, 26, and 23, 27 in Figs. 2 to 7, surfaces 34 and 35 in Fig. 9, and surfaces 36 and 37 in Fig. 10.

Normally these surfaces will re-assume a centered position each time the thrust transmitting and thrust receiving members return to their respective neutral positions because the relative movement between the contacting surface is a rolling movement without slippage. Consequently the re-positioning means about to be described is normally ineffective. In case the least slipping or sliding movement does occur between the two contacting surfaces during repeated deflection cycles, however, the said means re-centers them as they return to their neutral positions. Such means also serves the secondary functions of predetermining within close limits the path of travel of the thrust transmitting member, and of restricting within extremely close limits any possible relative sliding or slipping movement of the two rolling contact surfaces.

In the embodiment mentioned the means for performing the above described functions includes open side slideways 38, 39, 40 and 41 (Fig. 8), one in each end of each of the striker bars 20 and 21. The respective upper and lower surfaces of these slideways may be parallel, but I have found by test that it is more practical to make them slightly divergent aftward as shown clearly in Figs. 6 and 7.

Each slideway receives and cooperates with a shoe 42 having a cylindrical hole 43 (Fig. 8) open at the outer side of the shoe. Each hole 43 receives and closely journals a link pin 44 carried by a link 45 which projects forwardly from and is rigidly secured to spar 25 by means of bolts 46. A similar link 47 is similarly secured to spar 25 near the opposite ends of the two thrust transmitting members 20 and 21. Each link carries two properly located link pins 44 and each link pin is journaled in a respective one of the shoes 42. The relative locations of the links 45 and 47 are clearly shown in Fig. 1.

Each link 45, 47 is provided with a tapped hole 48 (Fig. 8) which receives the similarly threaded inner end of a hinge pin 49 (Fig. 1) which is first passed through a cooperating hinge bracket 50 and an arm 51 (Fig. 1) which is rigidly secured by bolts 52 to a wing rib 53 or similar fixed component of wing 15. The brackets 50, the links 45 and 47, the arms 51, and the pins 49 thus constitute the aligned control surface hinge joints 17 and 18, and a plurality of such aligned joints are spaced along the leading edge of the control surface 16.

Referring to Fig. 6, the relative assembled positions and configurations of the above described components are shown therein when the thrust transmitting and receiving members are in their neutral positions. The respective upper and lower link pins 44 are in axial alignment, and their respective longitudinal axes pass through the respective transverse median lines of the rolling contact surfaces 22—26 and 23—27. The central axes of pins 44 also lie in planes respectively common to the planes of the long axes 54 and 55 of push rods 29 and 30. It will also be noted that the respective long axes 54 and 55 pass through the longitudinal centerlines of upper and lower shoes 42 and through the centerlines of the shoe slideways 38 and 40. Upper and lower pins 44 are also equidistant from the control surface hinge axis 19. Note that the dimensions of the shoes 42 and of their slideways 38 and 40 are such that the respective upper and lower edges of each shoe 42 are in firm engagement with the respective upper and lower surfaces of the respective slideways, when the members 20, 21 and 24 are in their neutral positions.

Operation

Figure 7:
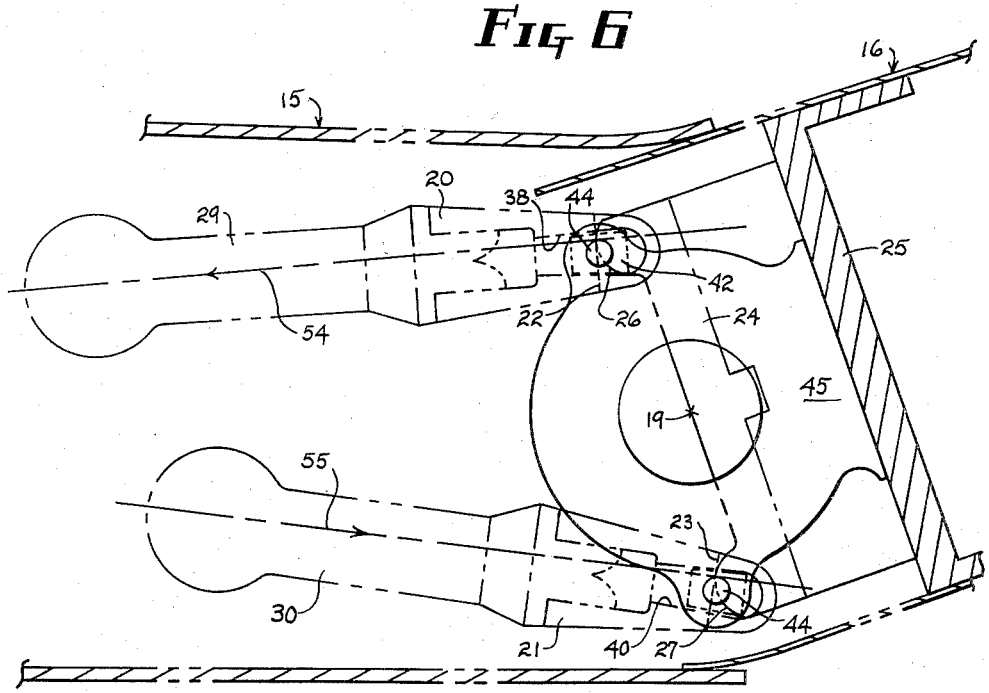

Referring first to Figs. 6 and 7, when thrust is applied aft along centerline 55 (Fig. 6) by the coacting push rods 30, rolling contact surface 23 of the transmitting member 21 transmits that force to convex rolling contact surface 27 of thrust receiving member 24 and member 24 is forcibly deflected counter clockwise about its axis 19. During such movement the various components assume the relative positions which they occupy in Fig. 7. Only a relative rolling movement occurs between the surfaces 22 and 26, and 23 and 27.

The positions of the upper and lower shoes 42 with respect to the links 45 and 47 remain unchanged throughout this movement, but due to the rolling movement and to the configuration of the rolling contact surfaces 22, 26 and 23, 27 there is a slight relative movement between the striker bars 20 and 21 and their respective shoes 42. During the rolling contact movement each striker bar 20 moves slightly either toward or away from hinge axis 19, depending on the direction of deflection of thrust receiving member 24. Simultaneously each shoe 42 is moved aft very slightly with respect to its striker bar. The relative shoe travel aftward can be seen by placing a pencil point at the exact center of either link pin 44 in Fig. 7 and noting the distance between the pencil point and the adjacent contact surface 22 or 23.

Due to the aftward divergence of the slide surfaces of each slideway 38 and 40, and the complemental divergence of the upper and lower surfaces of the shoes 42, the slight relative aftward movement of these shoes permits the necessary relative outward or inward movement of the striker bars 20 and 21 during their rolling movement on rolling contact surfaces 26 and 27 respectively.

Should either of the rolling contact surfaces 22 or 23 slip or slide in the slightest degree with respect to the concave surfaces 26 and 27 during repeated deflection cycles, such movement is limited to a very few thousands of an inch by contact of shoe 42 with one or the other of its cooperating slideway surfaces. Furthermore, should the slightest slipping movement occur, the shoe 42 will reposition the affected striker bar surface 22 or 23 with respect to its contacting surface 26 or 27 as soon as the control surface 16 and its attached links 45 are returned to neutral position. This is accomplished by the upper and lower surfaces of the shoe 42 moving into camming contact with the respective upper and lower surfaces of its particular slideway. Figs. 3, 4 and 5 further illustrate the relative movements of the various components during deflection of the thrust receiving member 24 by the thrust transmitting member 20.

It will be understood that means other than the combination of components above described can be designed and utilized to re-position the thrust transmitting member in case it ever slides or slips with respect to the pivoted thrust receiving member, to limit such slippage within extremely close limits, and to generally guide the thrust transmitting member during its travel. It will also be understood that with proper design no such means is essential to the proper thrust transmitting rolling contact movement of the thrust transmitting member with respect to the pivoted thrust receiving member.

From the above description it is clear that the invention provides a mechanism which affords transmission of an extremely large thrust force to a pivoted member through an extremely short moment arm, while maintaining friction between the thrust transmitting and the pivoted member so low as to require no lubricant between the contacting surfaces.

Having described the invention with sufficient clarity to enable those familiar with this art to construct and use it, I claim:

1. In a device of the class wherein a rigid member mounted on a fixed pivot axis has extremely high resistance to pivotal movement about said axis away from a neutral position, and the length of moment arm which may be employed to transmit torque to the member is extremely limited, mechanism for transmitting adequate torque to the rigid member to move it away from its neutral position comprising: a thrust receiving element rigidly carried by said rigid member, said element being elongated in a radial plane common to the pivot axis of the member and positioned parallel to such axis, and having a longitudinally extending rolling contact surface; a similarly elongated thrust transmitting element in juxtaposition with the thrust receiving element in a location spaced to one side of the mentioned radial plane, said thrust transmitting element also having a longitudinally extending rolling contact surface, at least one of said surfaces being convexly curved in cross section, the two said rolling contact surfaces being in tangential contact throughout the length of at least one of them; and power means operably connected to the thrust transmitting element for moving it toward the thrust receiving element along a plane perpendicular to said fixed pivot axis to force the rigid member to move away from its neutral position, the two surfaces in contact undergoing a relative rolling movement during pivotal movement of the rigid member away from said neutral position.

2. The mechanism described in claim 1 and means acting on the thrust transmitting element to re-position it after each movement cycle to assure continued rolling contact between the two rolling contact surfaces during repeated movement of the said rigid member away from its neutral position by the thrust transmitting member.

3. The mechanism described in claim 1 and means acting on the thrust transmitting element for closely limiting relative sliding movement between the two rolling contact surfaces during pivotal movement of the said rigid member by the thrust transmitting member to thus assure continued rolling contact between the two surfaces during repeated movement cycles.

4. The mechanism described in claim 1 and cooperating means carried by the said rigid member and acting on the thrust transmitting member to closely limit relative sliding movement between the two rolling contact surfaces to assure continued rolling contact between them during repeated movement cycles of the rigid member away from and back to its neutral position.

5. The mechanism described in claim 1 in which the rolling contact surface of one of said elements is planar and the rolling contact surface on the other element is convexly curved in cross section.

6. The mechanism described in claim 1 in which the power means comprises a plurality of independently supported parallel hydraulic working cylinders located in a common plane and arranged in a side by side row extending along and adjacent to the thrust transmitting element, the plunger of each cylinder being connected to the thrust transmitting element by an operative connection.

7. The invention described in claim 1 in which the said rigid member is a striker plate rigidly secured to and constituting the leading edge of an aircraft control surface, and the said fixed pivot axis pivotally connects the control surface to the trailing edge of a fixed aircraft surface; in which the thrust transmitting element is a striker bar; in which the power means is a plurality of parallel hydraulic cylinders supported by the fixed aircraft surface and arranged in a side by side row extending along and adjacent to the thrust transmitting element; and means affording an operative connection between the plunger of each cylinder and the thrust transmitting element.

8. The mechanism described in claim 4 in which the means for limiting sliding movement between the two rolling contact surfaces comprises: a pair of parallel slideways, one carried on each end of the thrust transmitting element, disposed parallel to the plane along which that element travels; a pair of guide shoes, one slidable longitudinally in each slideway and closely guided thereby; and a pair of fixed length links, each rigidly secured to the said rigid member in locations near the opposite ends of the thrust transmitting member and projecting into juxtaposition with a respective one of said guide shoes; and pins pivotally connecting each link with the respective adjacent guide shoe, the pivot axes of said pins being axially aligned, and their common axis coinciding with the line of tangential contact between the two rolling contact surfaces when the said rigid member is in its neutral position.

9. In a motion transmitting mechanism, a thrust receiving member mounted on and movable about a fixed transverse pivot axis, said member having a portion thereof extending radially outward from the pivot axis; a thrust transmitting member in contact with the radially outward extending portion of the thrust receiving member, the thrust transmitting member being movable in a plane perpendicular to said pivot axis and along the arc described by the radially outward extending portion of the thrust receiving member as said member pivots about its axis; means for forcibly moving the thrust transmitting member along the above described path to force the thrust receiving member to pivot about its axis; and a pair of rolling contact surfaces one carried by each member, at least one of said surfaces being convexly curved in cross section, said surfaces constituting the only portions of the two said members which are in actual contact during the transmission of force from one to the other member, the only relative movement between the two contacting surfaces being the rolling movement of one surface on the other.

No references cited.